(12) United States Patent
Vogler

(10) Patent No.: US 8,117,920 B2
(45) Date of Patent: Feb. 21, 2012

(54) PRESSURE SENSOR

(75) Inventor: Jes Vogler, Sydals (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 12/515,333

(22) PCT Filed: Nov. 21, 2007

(86) PCT No.: PCT/DK2007/000513
§ 371 (c)(1),
(2), (4) Date: Nov. 11, 2009

(87) PCT Pub. No.: WO2008/061532
PCT Pub. Date: May 29, 2008

(65) Prior Publication Data
US 2010/0064815 A1  Mar. 18, 2010

(30) Foreign Application Priority Data
Nov. 22, 2006 (DK) .................... 2006 1526

(51) Int. Cl.
*G01L 7/00* (2006.01)
(52) U.S. Cl. ......................................... 73/706
(58) Field of Classification Search .................. None
See application file for complete search history.

(56) References Cited

U.S. PATENT DOCUMENTS

| 3,943,915 | A | 3/1976 | Severson |
|---|---|---|---|
| 4,884,451 | A | 12/1989 | Schulze |
| 5,333,507 | A | 8/1994 | Vogler et al. |
| 5,509,312 | A | 4/1996 | Donzier et al. |
| 7,340,959 | B2 | 3/2008 | Sato |
| 2004/0069068 | A1* | 4/2004 | Otsuka et al. ............. 73/716 |
| 2004/0069627 | A1 | 4/2004 | Oda |
| 2005/0011273 | A1* | 1/2005 | Sasaki et al. ............. 73/756 |
| 2005/0139011 | A1* | 6/2005 | Yamakawa ............. 73/753 |
| 2005/0193825 | A1* | 9/2005 | Otsuka ............. 73/715 |
| 2005/0204823 | A1* | 9/2005 | Murai ............. 73/724 |
| 2006/0107750 | A1 | 5/2006 | Tanaka et al. |
| 2007/0095145 | A1* | 5/2007 | Sato ............. 73/716 |

FOREIGN PATENT DOCUMENTS

| DE | 10 2006 051 192 A1 | 5/2007 |
|---|---|---|
| EP | 0288827 A2 | 11/1988 |
| WO | 93/07457 A1 | 4/1993 |
| WO | 2004/053449 A1 | 6/2004 |

OTHER PUBLICATIONS

International Search Report for Serial No. PCT/DK2007/000513 dated Aug. 4, 2008.

* cited by examiner

*Primary Examiner* — Andre Allen
(74) *Attorney, Agent, or Firm* — McCormick, Paulding & Huber LLP

(57) ABSTRACT

The invention provides a restriction element for a pressure sensor to protect the pressure element from flow related damage. The pressure sensor comprising a housing with a fluid inlet channel and a chamber with a pressure element. The pressure element comprises a housing part with a recess covered by a sealing diaphragm forming a cavity. In the oil-filled cavity a sensor element is placed. The restriction element is placed in front of the sealing diaphragm protecting the pressure element and especially the sealing diaphragm from a damaging pulse or other flow related damages caused by sudden changes in a flow system for example by closing a valve.

11 Claims, 4 Drawing Sheets

PRESSURE SENSOR

CROSS REFERENCE TO RELATED APPLICATIONS

This application is entitled to the benefit of and incorporates by reference essential subject matter disclosed in International Patent Application No. PCT/DK2007/000513 filed on Nov. 21, 2007 and Danish Patent Application No. PA 2006 1526 filed Nov. 22, 2006.

FIELD OF THE INVENTION

The present invention relates to a pressure sensor comprising a housing with a fluid inlet channel and a chamber. In the chamber is placed a pressure element comprising a housing part with a recess. The recess is covered by a sealing diaphragm to provide a substantially closed cavity. In the cavity is placed a measuring diaphragm. A restriction element is placed in front of the sealing diaphragm to protect the sealing diaphragm from a damaging pulse or other flow related damages.

BACKGROUND OF THE INVENTION

In a flow system different problems caused by changes in the flow can damage a pressure sensor like the one in this invention; especially the sealing diaphragm can be damaged. The problems causing damage can be cavitations or pressure peaks or start up liquid jets.

In flow systems where sudden changes in the flow can occur for example by closing a valve, it is well known that cavitations related to "liquid hammer" can give huge pressure changes which can cause damage to pressure sensors especially to the sealing diaphragm. When a valve suddenly is closed the flow medium decelerates, creating cavitations forming gas pockets and when the flow medium returns, it will result in huge pressure changes. If these cavitations are close to a pressure sensor, the change in pressure will have the effect that liquid will be hammered against the sensor causing possible damage to the sealing diaphragm or to the micromechanical elements covered by the sealing diaphragm.

Pressure peaks, occurring in the flow system due to changes in the flow, can also damage the diaphragms in a pressure sensor. This is however mostly a problem for the measuring diaphragm inside the pressure element. The measuring diaphragm can be made of silicon or steel. Measuring diaphragms made of steel are more sensitive to pressure peaks than measuring diaphragms made of silicon.

When a flow system is empty and then filled with the flow medium; start up jets can occur, when the flow medium enters the empty pressure sensor with high speed. The start up jets can damage the sealing diaphragm.

The document U.S. Pat. No. 5,509,312 describes a diaphragm pressure sensor with integrated anti-shock protection means. The diaphragm pressure sensor can withstand relatively large shocks without the shocks resulting in the diaphragm bursting or in any damage to the sensor. One embodiment is a passage with a strait hole, where the strait hole works as a low pass filter cutting off the high pressure peaks.

Another prior art is an existing design for a pressure sensor, where a nozzle is welded into the pressure-connection inlet (FIG. 1). There is a relatively long distance between the nozzle and the sealing diaphragm. The long distance is necessary because the nozzle-hole is straight. If the distance between the nozzle and the sealing diaphragm is shorter, there is a risk a damaging liquid-jet in the start-up situation will damage the sealing diaphragm.

Further more the existing solutions in form of pulse snubbing restriction elements are difficult to mount, because they are placed in the fluid inlet. Extra effort is necessary to be sure the restriction element is securely mounted. The restriction element can be welded into the inlet or fastened in other ways. If the restriction element is damaged, it can fall out and disappear.

BRIEF SUMMARY OF THE INVENTION

The object of this invention is to make a restriction element for a pressure sensor to protect the pressure element especially the sealing diaphragm from damaging pulses or other flow related damages. The restriction element is easy to place in the pressure sensor, it cannot fall out and disappear, and it is cheap to manufacture. The restriction element can be an integrated part of the pressure element, or it can be an independent part placed in the chamber between the inlet and the pressure element. The invention is a restriction element for a pressure sensor.

The pressure sensor comprises a pressure sensing arrangement with a measuring diaphragm in a pressure element. A sealing diaphragm covers a recess in the housing part of the pressure element, providing a substantially closed cavity in the housing part. The closed cavity is filled with a sealing media typically oil to transfer the pressure from the sealing diaphragm to the measuring diaphragm.

The restriction element is forming a damping chamber in front of the sealing diaphragm, protecting the sealing diaphragm from damage in case of big pressure changes occurs. In the preferred embodiment the restriction element is welded to the housing, and it is supporting the sealing diaphragm during welding. Usually a weld support element is used to support the sealing diaphragm in the welding process. The sealing diaphragm is too thin for welding alone without being damaged, so the weld support element is used to protect the sealing diaphragm during the welding process. In this invention the weld support ring and the restriction element is merged in one unit, where the restriction element works as a weld support element supporting the sealing diaphragm. So the restriction element in this embodiment is a weld support element wherein the restriction element is an integrated part of the weld support element.

By using the restriction element integrated in the weld support element the restriction element is simple and cheap to manufacture, because the restriction element and the weld support element is merged in one unit and can be manufactured in one step. In the same manufacturing procedure a nozzle with a sufficient accurate small orifice opening can be made. This simplifies the production and reduces the cost compared to existing solutions. Since the restriction element is part of the weld support element; the restriction element is practically free of cost.

By placing the pulse snubbing restriction element between the fluid inlet channel and the pressure element, the restriction element is placed in a way it cannot fall out. Further more it makes it easier to assemble the pressure sensor, because the restriction element is welded to the pressure element and therefore mounting the pressure element and the restriction part is done in one operation.

Another embodiment is to place the restriction element between the fluid inlet channel and the pressure element, where the restriction element is a separate part from the weld support element, so the restriction element and the weld support element are both included in the pressure sensor as two independent parts. The restriction element can be an independent part or it can be integrated in the design in a different way. The restriction element is placed in a chamber between in fluid inlet channel and the pressure element.

The restriction element can be fastened to a wall part of the chamber between the pressure element and the fluid inlet channel, or it can be a lose part placed in the chamber in such a way that it is kept in place between the pressure element and the housing.

It is still easy to mount the restriction part, because it is mounted from the same side as the pressure element into the chamber in the pressure sensor housing.

The restriction element is a cover forming a damping chamber in front of the sealing diaphragm. In the restriction element there is a small recess, a nozzle, into the damping chamber, allowing flow medium to flow into the damping champing, to make contact with the sealing diaphragm, transferring pressure changes to the sealing diaphragm.

A unique feature in the invention is that the nozzle hole is pointed away from the sealing diaphragm. A straight hole has the risk of damaging the sealing diaphragm in the start-up situation. Because the nozzle hole is pointed away from the sealing diaphragm the liquid is entering the damping chamber without hitting the sealing diaphragm directly, the nozzle hole can therefore be close to the sealing diaphragm. In existing designs, with a strait hole, the hole has to be a relative long distance away from the diaphragm to avoid liquid-jets in the start-up situation, where the chamber is air filled.

Problems occurring in flow systems can be cavitations or pressure peaks or start up liquid jets.

When a valve is closed the forward movement of the liquid stops and the resulting turbulence can lead to creation of cavitations in the flow medium. When the medium refills the cavitations, sudden pressure changes can occur. The sudden pressure changes can damage the sealing diaphragm because of the non-homogeneity of the pressure media front. Here the restriction element protects the sealing diaphragm in two situations: 1) the nozzle restricts cavitations to occur in the damping chamber, 2) if cavitations have occurred in the damping chamber, the pressure changes are damped by the nozzle.

When a flow system is empty and then filled with the flow medium, the start up jets occurs. The restriction element in this case shields the sealing diaphragm and prevents the jets to hit the sealing diaphragm directly.

The pressure peaks occurring in the system is not a real problem, when the measuring diaphragm is of silicon since silicon can handle higher pressure, the orifice opening in the nozzle can be relatively big so pressure peaks can pass into the damping chamber. However cavitations should preferable stay outside the damping chamber, so the nozzle prevents flow medium to flow out of the damping chamber when cavitations occurs, protecting the sealing diaphragm from the effects of flow medium returning to fill the cavitations. If a measuring diaphragm of steel or similar materials is used, the orifice opening in the nozzle can be smaller to damp the pressure peaks.

The flow medium can be for instance water, ammoniac, coolant, oil etc.

BRIEF DESCRIPTION OF THE DRAWINGS

In the following, a preferred embodiment of the invention will be explained in further details with reference to the drawing in which.

DETAILED DESCRIPTION OF THE PREFERRED EMBODIMENTS

Figure 1:
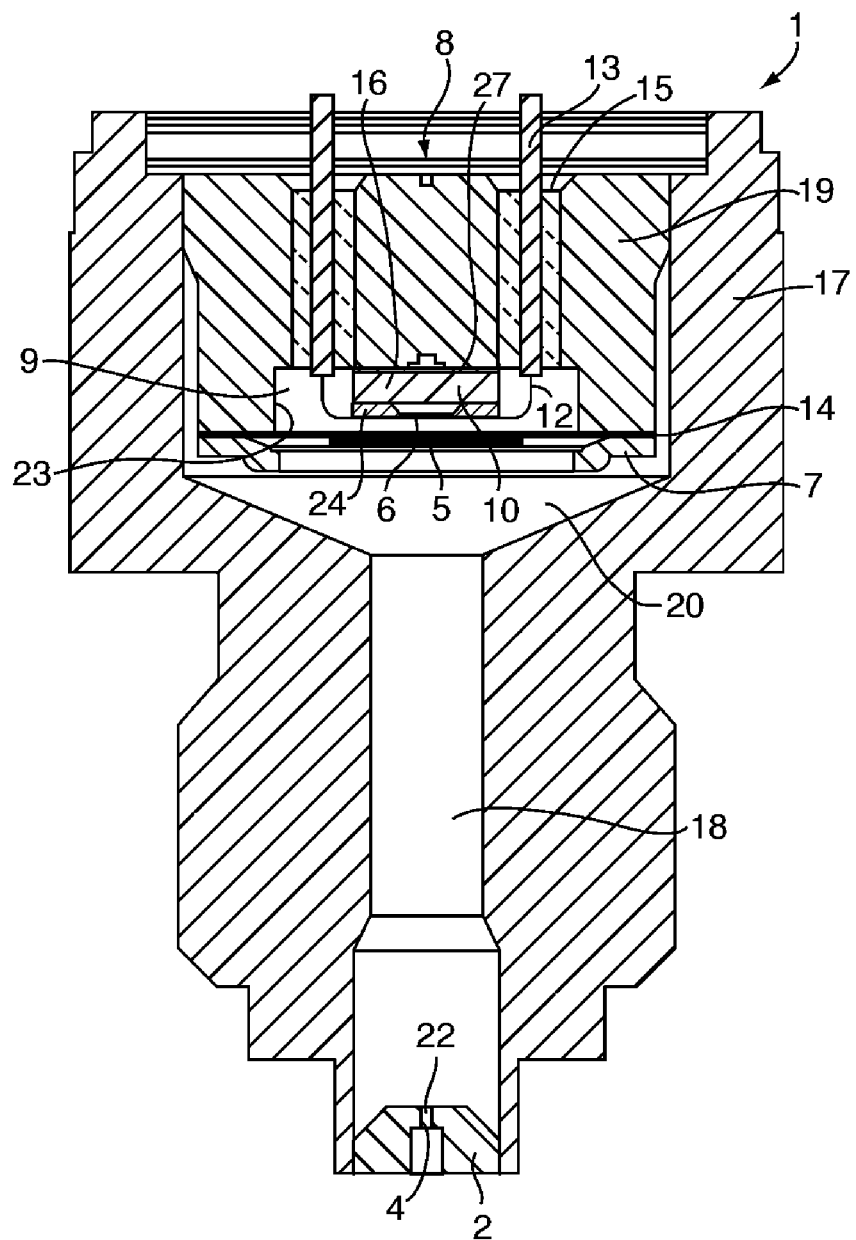
FIG. 1 is a prior art pressure sensor.

FIG. 1 is a prior art pressure sensor 1 comprising a housing 17 with a fluid inlet channel 18 and a chamber 20. In the chamber is mounted a pressure element 8. The Pressure element 8 comprises a housing part 19 with a sensor element 16 and a sealing diaphragm 5. The sealing diaphragm 5 covers a recess 23 forming a cavity 9. The sensor element 16, comprising a support 10 and a silicon (Si) sensor 24, is placed in the cavity 9 fastened to the housing part 19 by an adhesive 27. The Si-sensor 24 has measuring diaphragm 6. The Si-sensor is connected to bond wires 12 and feed-through pins 13. The feed through pins are isolated by an isolation layer 15. The sealing diaphragm 5 is placed between the housing part 19 and a weld support element 7. The weld support element 7 is used to support the sealing diaphragm 5 during welding, because the sealing diaphragm 5 is to thin to be welded without support, the welding leaves a weld joint 14. A restriction element 2 is placed in the inlet channel 18. In the restriction part 2 is a nozzle 4 with an orifice opening 22.

Figure 2:
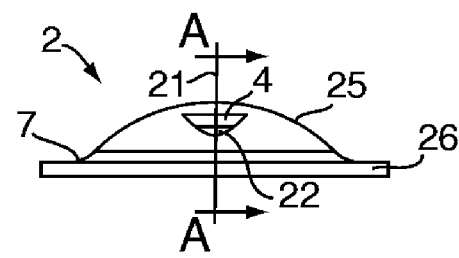
FIG. 2 is a restriction element with a nozzle.

FIG. 2 shows restriction element 2 comprising a bowl-formed cover 25 with flanges 26 and a nozzle 4. The nozzle forms an orifice opening 22. The restriction element 2 is an integrated part of the weld support element 7. A line A-A marks the cross section 21 shown in FIG. 3.

Figure 3:
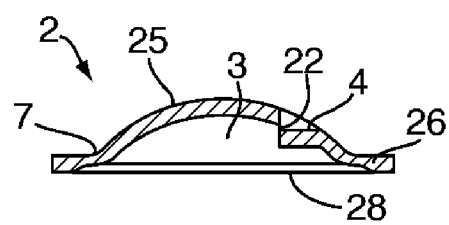
FIG. 3 is a cross section of the restriction element. The cross section is marked with a vertical line in FIG. 2.

FIG. 3 shows the cross section 21 marked in FIG. 2 (A-A) of the restriction element 2 with the bowl-formed cover 25 with flanges 26, the nozzle 4 and a damping chamber 3 and the weld plane 28.

Figure 4:
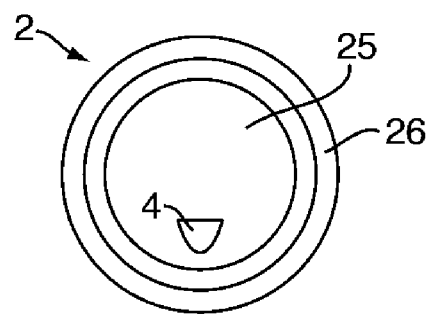
FIG. 4 is the restriction element seen from above.

FIG. 4 shows the restriction element 2 with the bowl-formed cover 25 with flanges 26 and the nozzle 4 seen from above.

Figure 5:
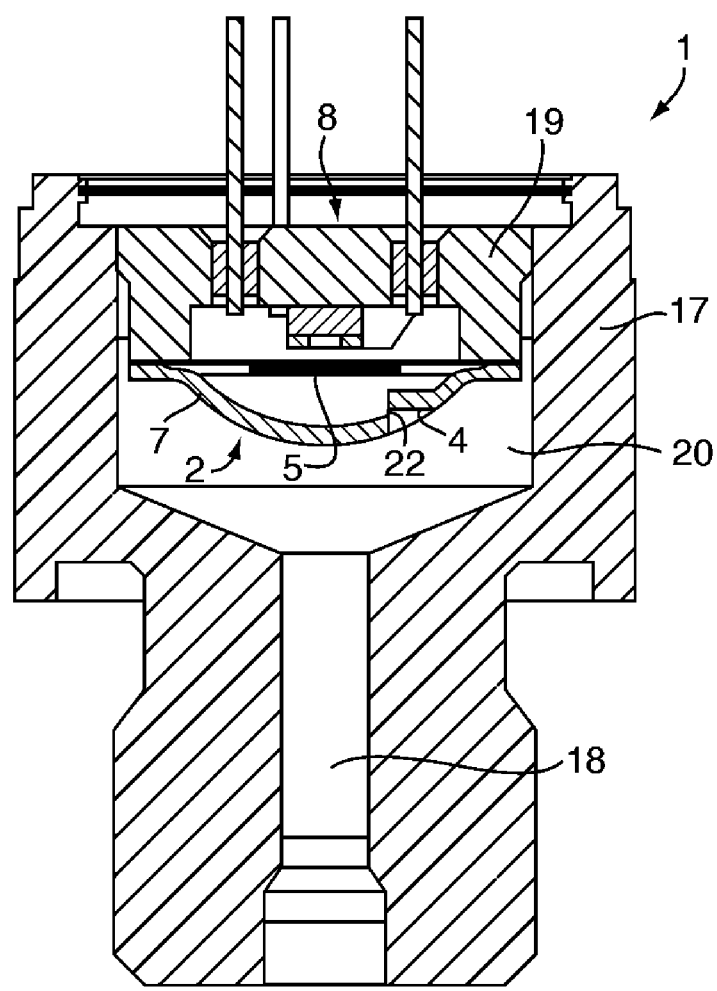
FIG. 5 is the restriction element mounted on a pressure element placed in a housing.

FIG. 5 shows the pressure sensor 1 with the restriction element 2 located in the chamber 20 between the pressure element 8 and the fluid inlet channel 18. The restriction element 2 is in this embodiment an integrated part of the weld support element 7 supporting the sealing diaphragm 5 during welding so the restriction element is fastened to the housing part 19.

Figure 6:
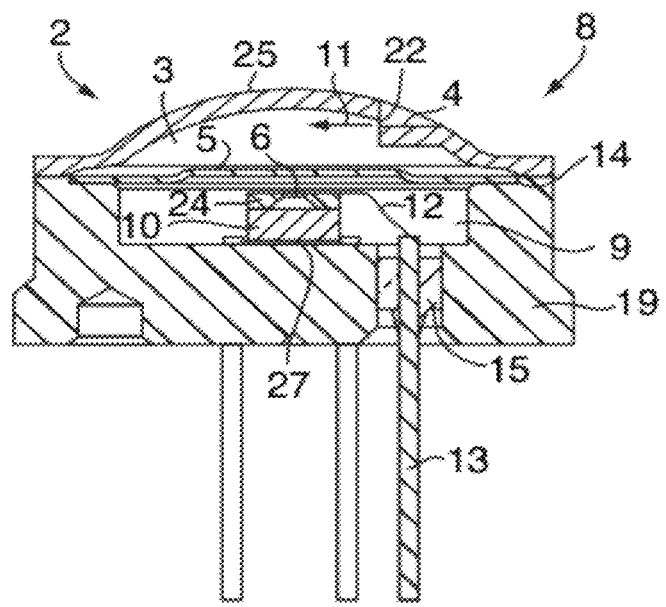
FIG. 6 is a pressure element for a pressure sensor with a restriction element mounted.

FIG. 6 shows the pressure element 8 with the restriction element 2 comprising a cover 25 with a nozzle 4. The restriction element 2 is mounted on the pressure element 8 forming a damping chamber 3 in front of the sealing diaphragm 5. The nozzle 4 is placed so the flow (marked by an arrow 11) is parallel to the sealing diaphragm 5. Behind the sealing diaphragm 5 is a cavity 9 filled with a sealing media typically oil and the measuring diaphragm 6. The measuring diaphragm 6 is usually a silicon pressure sensor. The restriction element 2 is welded to the sealing diaphragm 5 and the housing part 19 at the joint 14. The pressure executed by the fluid at the sealing diaphragm 5 is transmitted to the measuring diaphragm 6 by the sealing media in the cavity 9. The measured pressure is then transmitted from the measuring diaphragm 6 through a Bond Wire 12 and the Feed-Through pin 13. The measuring diaphragm 6 is part of the Si-sensor 24 and is placed on a support 10, the support being fastened to by the adhesive 27 to the housing part 19.

In FIG. 6 the weld support element 7 seen in FIG. 1 is replaced by the restriction element 2. The restriction element 2 has the same functionality, regarding supporting the sealing diaphragm in the welding process, as the weld support element 7 in FIG. 1, besides the functionality of protecting the pressure element 8 and in particular the sealing diaphragm 5.

Figure 7:
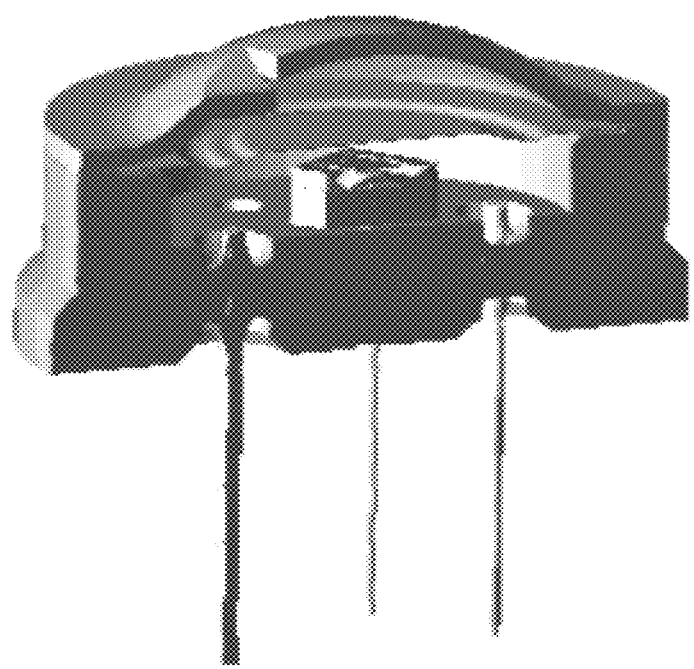
FIG. 7 is a 3-dimensional drawing of the pressure element in FIG. 6.

In FIG. 7 is a 3-dimensional drawing of the weld support element from FIG. 6.

Manufacturing the restriction element 2 is not adding any extra costs to the production, because the restriction element 2 is integrated in the weld support element 7. Therefore manufacturing the restriction element 2 is done the same way as the weld support element 7 is manufactured.

The restriction element 2 forms a damping chamber 3 in front of the sealing diaphragm 5. In the restriction element 2 there is a nozzle 4 with an orifice opening 22 into the damping chamber 3, allowing the liquid to pass into the damping chamber 3, and allowing transfer of pressure transients into the damping chamber 3 to the sealing diaphragm 5.

The nozzle 4 in the restriction element 2 is made, so it is pointed away from the sealing diaphragm 5. The flow of the liquid will be in a direction almost parallel to the diaphragm 5 indicated by the arrow 11. Because the nozzle 4 is pointed away from the sealing diaphragm 5, the flowing liquid is not directly hitting the sealing diaphragm 5; the nozzle 4 can be close to the sealing diaphragm 5, because the flow is directed away from the sealing diaphragm 5. With a straight hole like the nozzle 4 in prior art FIG. 1, there is a risk of damaging the sealing diaphragm 5 with a liquid jet in the start-up situation, because the flow is not directed away from the sealing diaphragm, therefore with a strait hole, the nozzle 4 in FIG. 1 has to be in a relative long distance from the diaphragm, so the risk for damaging the diaphragm 5 with a liquid-jet in the start-up situation, where the chamber is air filed, is reduced. Because of the nozzle 4 is pointing away from the diaphragm 5, the risk of start up damage by a liquid-jet is eliminated, without having to make costly modifications of the design of the pressure sensor.

By placing the restriction element 2 between the fluid inlet channel 18 and the pressure element 8, the restriction element 2 is placed in a way it cannot fall out, because the restriction element 2 is larger than the cross diameter of the fluid inlet channel 18. Further more it is easier to assemble the pressure sensor 1, because the restriction element 2 is welded to the pressure element 8 and therefore mounting the pressure element 8 and the restriction part 2 are done in one operation.

The nozzle 4 in the restriction element 2 is arranged in a region of a flaw-shaped stamped recess in the cover portion 25. The nozzle 4 can be made by a simple flaw shaped stamping, length about 1 mm and height 0.1 mm, making an orifice opening with a cross-sectional area about 0.1 mm$^2$. This shape gives at the same time a unique flow-through almost parallel to the sealing diaphragm 5.

The pressure sensing bandwidth in the pressure sensor 1 is bigger than 150 Hz. This is possible because the sealing diaphragm 5 is well protected by the restriction part 2.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A pressure sensor comprising:
    a housing with an fluid inlet channel and a chamber,
    a pressure element arranged in the chamber,
    a restriction element with a orifice opening,
    the restriction element is arranged within the chamber and located between the pressure element and the fluid inlet channel, the sensor further comprising a sealing diaphragm wherein the flow-direction from the orifice opening is directed away from the sealing diaphragm.

2. The pressure sensor according to claim 1, wherein the restriction element is fastened to a wall portion of the chamber.

3. The pressure sensor according to claim 1, wherein the restriction element is fastened to the pressure element.

4. The pressure sensor according to claim 3, the sensor further comprising a weld support element, wherein the restriction element is an integrated part of the weld support element.

5. The pressure sensor according claim 1, wherein the restriction element comprises a bowl-formed cover and flanges.

6. The pressure sensor according to claim 5, wherein the restriction element forms a damping chamber in front of the pressure element.

7. The pressure sensor according to claim 1, wherein the flow-direction from the orifice opening is almost parallel to the sealing diaphragm.

8. The pressure sensor according to claim 1, wherein the orifice opening is formed by a nozzle.

9. The pressure sensor according to claim 8, wherein the nozzle is arranged in a region of a flaw-shaped stamped recess in the cover portion.

10. The pressure sensor according to claim 9, wherein the cross-sectional area of the orifice opening is about 0.1 mm$^2$.

11. The pressure sensor according to claim 10, wherein the pressure sensing bandwidth is bigger than 150 Hz.

* * * * *